United States Patent
Chavez et al.

(10) Patent No.: US 8,282,128 B2
(45) Date of Patent: Oct. 9, 2012

(54) AIRBAG ASSEMBLY

(75) Inventors: Spencer W. Chavez, Linden, MI (US); Vera Ljajcaj, Shelby Township, MI (US)

(73) Assignee: TK Holdings Inc., Auburn Hills, MI (US)

( * ) Notice: Subject to any disclaimer, the term of this patent is extended or adjusted under 35 U.S.C. 154(b) by 149 days.

(21) Appl. No.: 12/662,648

(22) Filed: Apr. 27, 2010

(65) Prior Publication Data

US 2010/0276917 A1 Nov. 4, 2010

Related U.S. Application Data

(60) Provisional application No. 61/213,037, filed on Apr. 30, 2009.

(51) Int. Cl.
*B60R 21/16* (2006.01)

(52) U.S. Cl. ........................................................ 280/740

(58) Field of Classification Search .................. 280/740, 280/742, 736
See application file for complete search history.

(56) References Cited

U.S. PATENT DOCUMENTS

| | | | |
|---|---|---|---|
| 5,172,933 A * | 12/1992 | Strasser ........................ | 280/740 |
| 5,494,314 A | 2/1996 | Kriska et al. | |
| 5,573,270 A | 11/1996 | Sogi et al. | |
| 5,951,038 A * | 9/1999 | Taguchi et al. ................. | 280/729 |
| 6,554,316 B2 * | 4/2003 | Schneider et al. .......... | 280/743.1 |
| 6,945,556 B2 | 9/2005 | Maertens | |
| 7,407,185 B2 * | 8/2008 | Maripudi et al. ........... | 280/743.1 |
| 7,942,440 B2 * | 5/2011 | Choi ............................. | 280/740 |
| 2007/0182134 A1 * | 8/2007 | Mizuno et al. .............. | 280/730.1 |
| 2007/0200321 A1 * | 8/2007 | Heitplatz et al. ............ | 280/730.1 |
| 2007/0278774 A1 * | 12/2007 | Ishiguro et al. .............. | 280/740 |

* cited by examiner

*Primary Examiner* — Faye M. Fleming
(74) *Attorney, Agent, or Firm* — Foley & Lardner LLP

(57) ABSTRACT

An airbag assembly comprises an airbag cushion, an inflator to provide inflation gas to inflate the airbag cushion, and a diffuser provided between the inflator and the airbag cushion. The diffuser includes a plurality of panels. The plurality of panels force the inflation gas to change flow direction at least two times before the inflation gas exits into the airbag. The panels each include openings for inflation gas to pass through. Openings in a first panel are not aligned with the openings in a second panel.

18 Claims, 5 Drawing Sheets

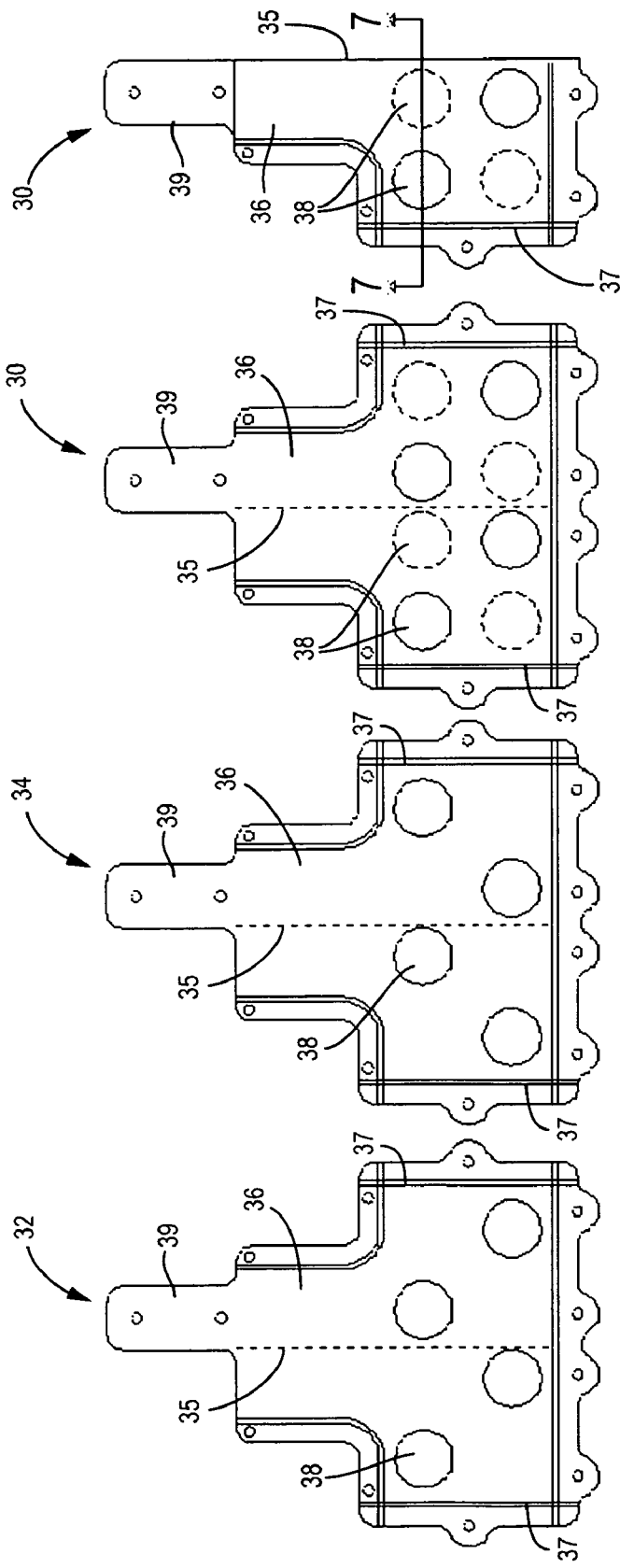

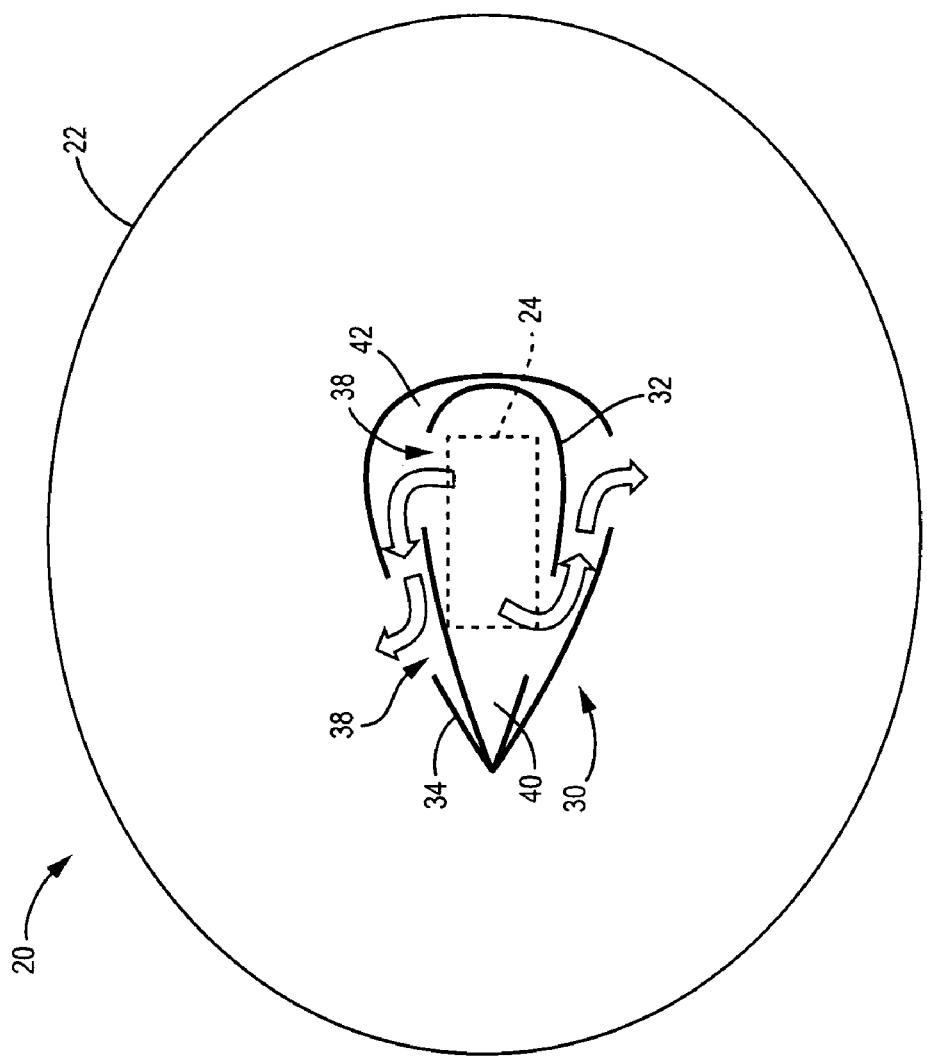

AIRBAG ASSEMBLY

CROSS-REFERENCE TO RELATED PATENT APPLICATIONS

This application claims priority to U.S. Provisional Patent Application No. 61/213,037, filed Apr. 30, 2009, which is incorporated herein by reference in its entirety.

BACKGROUND

The present application relates generally to the field of vehicle airbags. More specifically, the application relates to a diffuser for an airbag module with a complex path for escaping gasses.

An inflatable airbag that uses an inflation device that generates gas through pyrotechnic ignition, stored gas or combination thereof typically requires diffusion of the gas into the airbag cushion to properly inflate the cushion and preserve the integrity of the cushion fabric. The need for a diffuser is especially apparent in high pressure systems, fast deploying systems, or systems where gas generation creates large amounts of heat and/or particulate from the combustion process. Such diffusers generally include a deflection surface or plate that is perpendicular to the path of the gas from the gas generator. The gas is then redirected through outlet passages to the interior of the airbag cushion to inflate the airbag cushion.

Current air bag diffusers employ an open path diffusion method where inflation gasses have direct line of sight with the outlet passages of the gas diffuser. This line of sight can be from several directions, side to side (e.g., a loop diffuser, as shown in FIG. 8), directional in only one direction (e.g., to the bottom, as shown in FIG. 9), or multi-directional (e.g., a gas sleeve, as shown in FIG. 10). However, with each of the existing types of diffusers, the inflation gas only changes directions one time before exiting the diffuser.

It would be desirable to provide a diffuser that redirects the inflating gasses multiple times to better diffuse the inflating gas and trap any particulate byproducts from the gas generation process.

SUMMARY

One embodiment of the invention relates to an airbag assembly. The airbag assembly includes an airbag cushion, an inflator to provide inflation gas to inflate the airbag cushion, and a diffuser provided between the inflator and the airbag cushion. The diffuser includes a plurality of panels. The plurality of panels force the inflation gas to change flow direction at least two times before the inflation gas exits the diffuser and enters into the airbag.

Another embodiment relates to an airbag assembly. The airbag assembly includes an airbag cushion, an inflator to provide inflation gas to inflate the airbag cushion, and a diffuser provided between the inflator and the airbag cushion. The diffuser includes a first panel and a second panel. The first and second panels each include openings for inflation gas to pass through. The openings in the first panel are not aligned with the openings in the second panel.

Still another embodiment relates to a method of making a diffuser for an airbag assembly. The method includes providing first and second panels, providing openings in each of the first and second panels, overlaying the second panel on the first panel, folding the overlayed panels along central longitudinal midline of the overlayed panels, and attaching the folded and overlayed panels to an inflator and/or airbag cushion.

It is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate preferred embodiments of the invention and together with the description serve to explain principles of the invention.

FIG. 3 is a front view of a first panel for a diffuser with complex paths between the inlet and the outlets according to an exemplary embodiment.

FIG. 4 is a front view of a second panel for a diffuser with complex paths between the inlet and the outlets according to an exemplary embodiment.

FIG. 5 is a front view of the panels of FIGS. 3 and 4 overlayed according to an exemplary embodiment.

FIG. 6 is front view of a diffuser with complex paths between the inlet and the outlets according to an exemplary embodiment, in which the overlayed panels of FIG. 5 have been folded along a midline.

FIG. 7 is a cross-section view of the diffuser of FIG. 6 taken along line 7-7 showing the complex paths of the inflation gasses between the inlet and the outlet, when the diffuser is arranged in an airbag assembly with an airbag cushion and inflator.

DETAILED DESCRIPTION

Figure 1A:
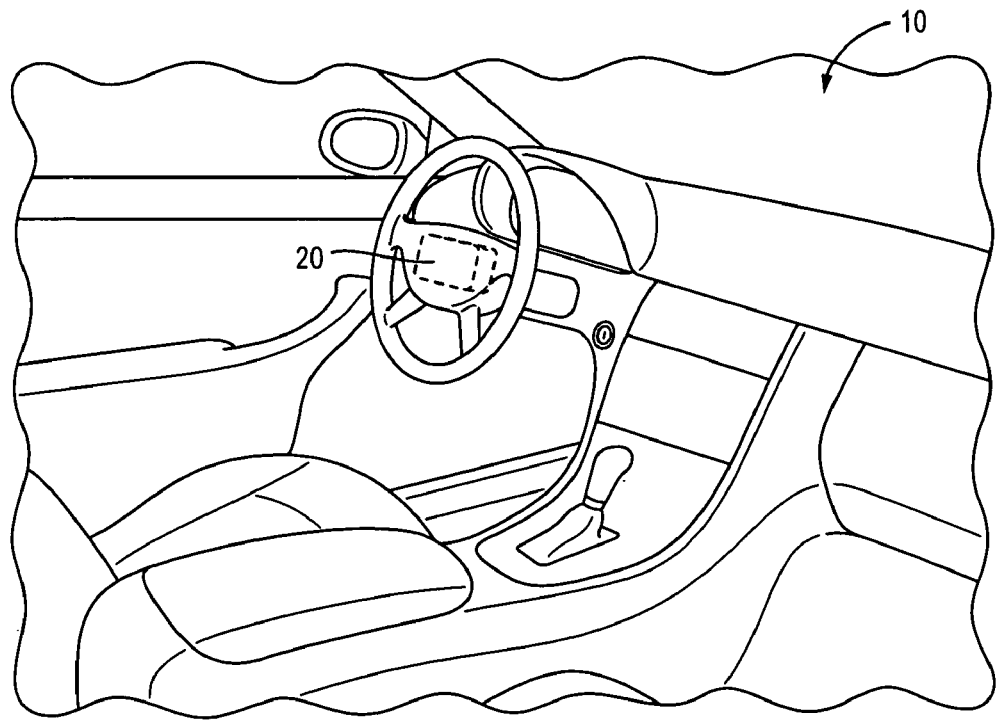
FIG. 1A is a perspective view of a portion of a vehicle interior including an airbag assembly with a diffuser according to an exemplary embodiment.
Figure 1B:
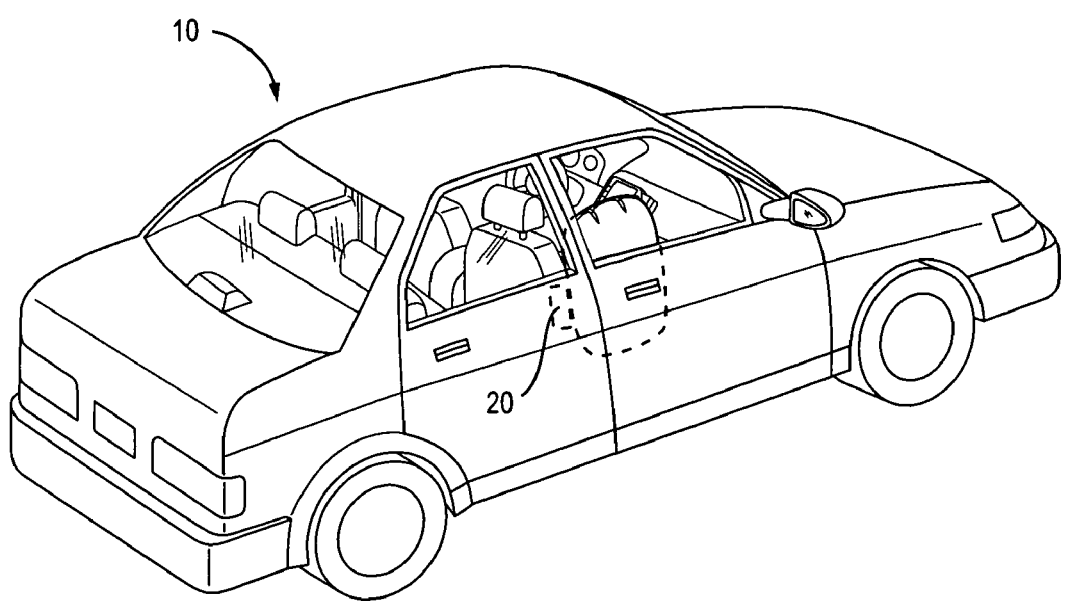
FIG. 1B is a perspective view of a vehicle including an airbag assembly with a diffuser according to an exemplary embodiment.

Referring to FIGS. 1A and 1B, a vehicle 10 is shown according to an exemplary embodiment. The vehicle 10 includes one or more seats that are configured to receive an occupant and are coupled to the vehicle. Airbags and airbag modules 20 may be provided at a variety of places within the vehicle to protect an occupant of the vehicle in a variety of impact scenarios. For example, airbags may be provided in the dashboard, proximate to the steering wheel, in the vehicle seats, in the door trim panels, in the headliner, etc. According to one exemplary embodiment, shown in FIG. 1A, a steering wheel airbag assembly 20 is coupled to the steering column. According to another exemplary embodiment, as shown in FIG. 1B, a side airbag assembly 20 is coupled to the vehicle seat.

Figure 2:
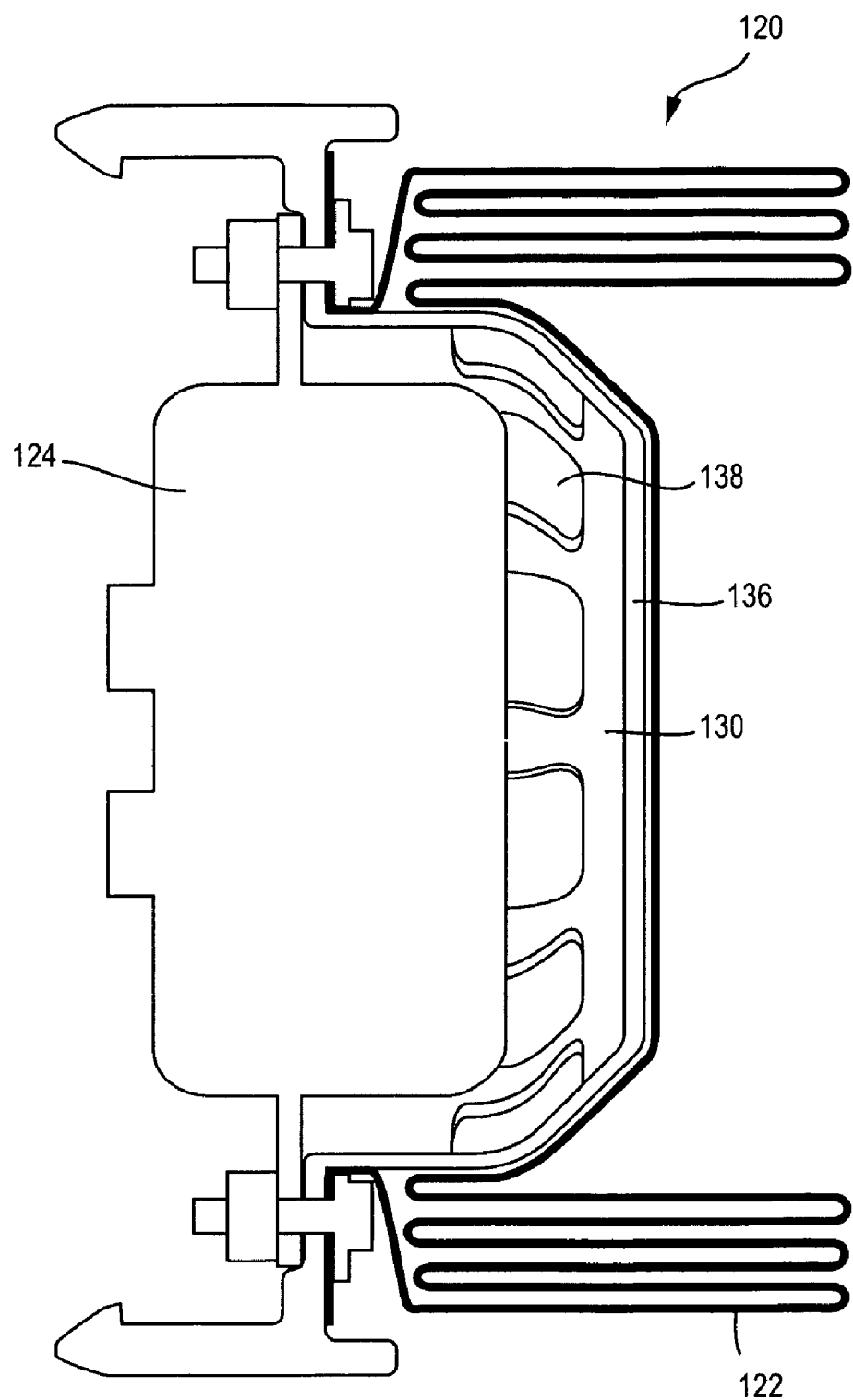
FIG. 2 is a cross-section of a prior art airbag assembly.

The conventional prior art airbag assembly 120 of FIG. 2 includes an inflator (e.g., gas generator) 124, a diffuser 130, and an airbag cushion 122. The inflator 124, such as a pyrotechnic gas generator, generates a gas that rapidly inflates the airbag cushion 122 in an impact or vehicle collision. The diffuser 130 is provided between the inflator 124 and the airbag cushion 122. An airbag assembly 120 that uses an inflation device (e.g., inflator 124) that generates gas through pyrotechnic ignition, stored gas or combination thereof typically requires diffusion of the gas into the airbag cushion 122 to properly inflate the cushion and preserve the integrity of the cushion fabric. The need for a diffuser 130 is especially apparent in high pressure systems, fast deploying systems, or systems where gas generation creates large amounts of heat and/or particulate from the combustion process. Such diffusers 130 generally include a deflection surface or plate 136 that is perpendicular to the path of the gas from the gas generator 124. The gas is then redirected through outlet passages 138 to the interior of the airbag cushion 122 to inflate the airbag cushion 122. The diffuser 130 is configured to diffuse the inflating gas and trap any particulate byproduct generated by the gas generator 124. However, such a conventional diffuser 130 allows the inflating gas to have a common direction and a direct line of sight from the inflator 124 to the outlets 138.

Referring to FIGS. 3-7, an airbag assembly 20 is shown. The airbag assembly 20 may be similar to the assembly 120, but includes an improved diffuser 30 that creates a complex path between the outlets of the inflator 24 and forces the inflating gas to change directions multiple times (such as shown by the arrows in FIG. 7). The diffuser 30 is provided in the interior volume of the airbag cushion 22 and directs combustion gasses produced by the inflator 24 into the airbag cushion 22 to inflate the airbag cushion 22. The multiple changes of direction help to better trap any particulates that may be formed during the combustion process. The diffuser 30 is configured, in embodiments, to diffuse the inflation gas and take the directional flow of the gas and alter the flow into a non-specific direction. The diffuser 30 can effectively create a semi-laminar non-directional flow of gas.

According to one exemplary embodiment, as an inflating gas enters the airbag cushion 22, the airbag cushion 22 bursts through an outer skin or cover of the airbag assembly 20 and inflates between the occupant of the vehicle and the steering wheel, dashboard, or other structural member of the vehicle. For instance, the airbag cushion 22 may emerge from below the outer covering of the steering wheel, through a cutaway in a trim panel, from behind a trim panel, from a seam between two panels or coverings, etc. According to various embodiments, the airbag assembly 20 may be configured within a glove box assembly or in other locations within the vehicle, such as beneath trim panels along the roof rail, trim panels along the vertical pillars (e.g., the A-pillar, B-pillar, and C-pillar), with the seat assembly, etc. The airbag assembly 20 is flexibly configurable for use in varying package requirements, and may be tailored to satisfy specific needs of the vehicle manufacturer.

According to an exemplary embodiment, the diffuser 30 may be formed by connecting a pair of fabric panels 32 and 34. The first fabric panel 32 (FIG. 3) and the second fabric panel 34 (FIG. 4) are flexible members that may be formed from a traditional airbag material, such as high strength nylon. Because they are formed from a flexible fabric material, the panels 32 and 34 can be folded into a compact package with the airbag cushion 22 when the airbag assembly 20 is stowed behind a trim or cover component.

The first panel 32 and the second panel 34 each include a neck portion 36 that forms an inlet and a plurality of openings 38, shown as generally circular holes. The first panel 32 and the second panel 34 are overlayed as shown in FIG. 5. The openings 38 in the first panel 32 and the second panel 34 are configured such that the openings 38 in the first panel 32 do not align with the openings 38 in the second panel 34 when the panels 32 and 34 are overlayed. According to one exemplary embodiment, the hole pattern in the first panel 32 is a mirror image of the hole pattern in the second panel 34. While the panels 32 and 34 are each shown having four identical openings 38 arranged as mirror images relative to each other, it should be understood that many variations are possible. For example, the openings 38 may not be round but may instead be rectangular, oblong, or otherwise shaped. The openings 38 on the first panel 32 or on the second panel 34 may not be a uniform size. Each of the panels 32 and 34 may include openings 38 of several different shapes and sizes. The openings 38 in the second panel 34 may differ in size, shape, number, or arrangement compared to the openings 38 in the first panel 32.

To construct the diffuser 30, the overlayed panels 32 and 34 are folded in half along their respective midlines 35 and the edges 37 sewn together. Two edges 37 of the first panel 32 and two edges of the second panel 34 are couple together along the sewn seam. Once folded in half and sewn together, the first panel 32 forms an inner chamber 40 that is nested inside an outer chamber 42 formed by the second panel 34, as shown best in FIG. 7. The neck portions 36 of the panels 32 and 34 form an inlet that allows inflating gas from the gas generator 24 to enter the inner chamber 40 formed by the first panel 32. A mounting tab 39 facilitates coupling the diffuser 30 to the gas generator 24 and the vehicle frame (e.g., with a retainer or other mounting device). While the panels 32 and 34 are described as being sewn together, in other embodiments, the edges 37 may be otherwise coupled together, such as with an adhesive, heat sensitive material, etc.

In other embodiments, the diffuser 30 may be made from more than two panels. One or more panels may be used to form an inner chamber 40 and one or more panels may be used to form an outer chamber 42. For example, according to another exemplary embodiment, the first panel 32 and the second panel 34 shown in FIGS. 3 and 4 may replaced by two panels each. The four panels may be overlayed and the edges coupled together to form an inner chamber 40 and an outer chamber 42 similar to that seen in FIG. 7, but coupled together on two sides, when seen in cross section, instead of one side. In an embodiment, any suitable number of panels may be used to form the diffuser 30. For example, the diffuser 30 can have three, four, five, six or more panels. The panels may have the same mirror image and offset hole pattern configuration as described above. The more panels that a diffuser 30 comprises will create more layers for gas diffusion and particulate entrapment.

The gas from the gas generator 24 enters the inner chamber 40 formed by the first panel 32 through the neck portion 36. The gas then passes through the openings 38 in the first panel 32 into the outer chamber 42 between the second panel 34 and the first panel 32. Once in the outer chamber 40, the gas is forced to change direction by the fabric of the second panel 34 and flows sideways between the first panel 32 and the second panel 34. Once the inflation gas reaches the openings 38 in the second panel 34, the gas changes direction again and escapes into the airbag cushion 22 to inflate the airbag cushion 22. The gas is shown to follow symmetrical paths on the top of the diffuser 30 and the bottom of the diffuser 30. In other embodiments, depending on the size, shape, arrangement, and number of openings 38 in the first panel 32 and the second panel 34, a greater percentage of the total flow of gas may pass through openings 38 on the top of the diffuser 30 or the bottom of the diffuser 30. In other embodiments, openings 38 may only be provided on either the top of the diffuser 30 or the bottom of the diffuser 30. In still other embodiments, gas may be directed out of the inner chamber 40 through openings 38 on one side of the diffuser 30 and be directed on a longer path through the outer chamber 42 to exit the diffuser 30 through openings 38 on the opposite side of the diffuser 30.

Figure 8:
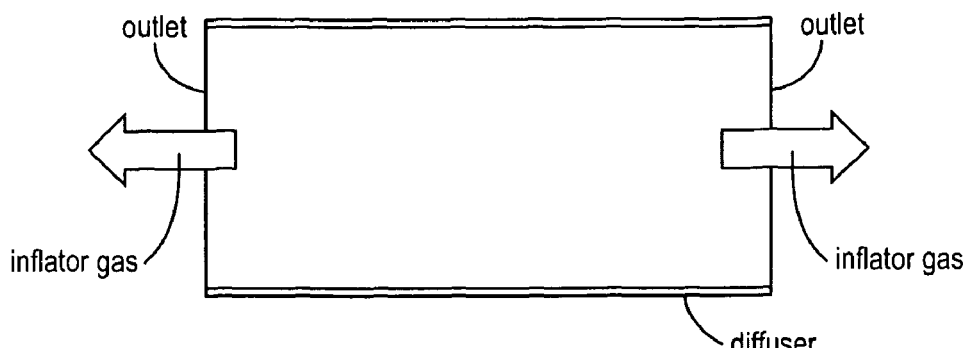
FIG. 8 is a front view of a prior art diffuser with outlets on either side.
Figure 9:
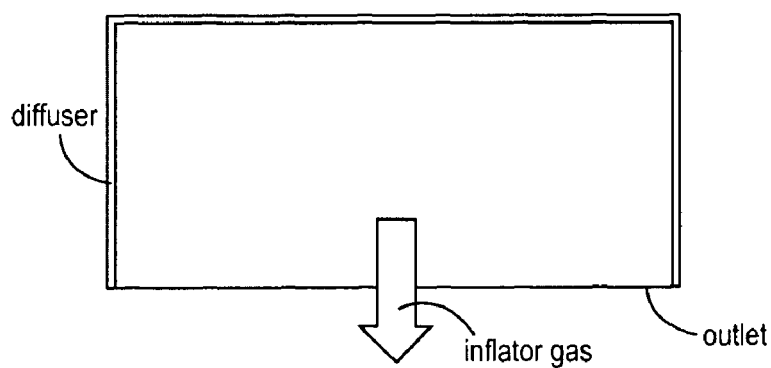
FIG. 9 is a front view of a prior art diffuser with unidirectional outlets along the bottom.
Figure 10:
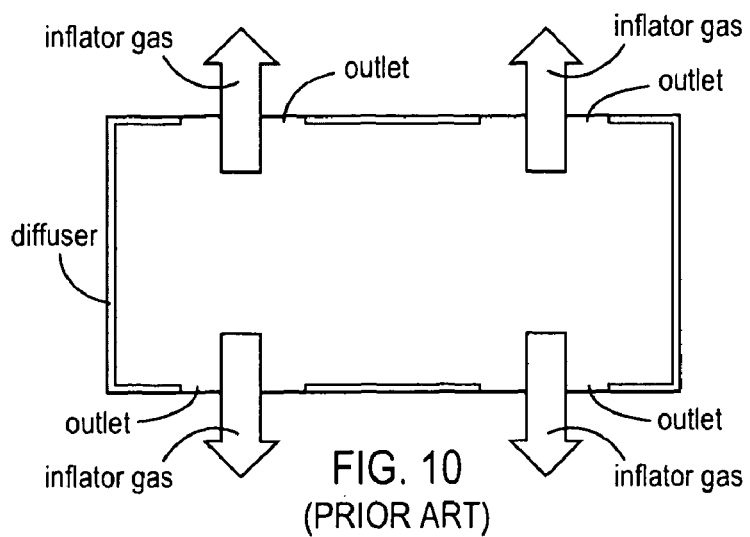
FIG. 10 is a front view of a prior art diffuser with multidirectional outlets on the top and bottom.

By forcing the inflation gas to follow a complex and indirect path into the airbag cushion 22, the diffuser 30 is able to more effectively trap particulates compared to conventional diffusers in which the inflation gasses have a direct line of sight from the inflator to the outlet passages of the gas diffuser, as shown in FIGS. 8-10. More effectively trapping the particulates reduces the likelihood that the particulates will escape into the airbag cushion and cause any undesirable damage to the cushion.

Further, the diffuser 30 as shown in FIGS. 3-7 reduces the amount of heat to which the airbag cushion 22 is exposed. As the hot inflation gasses pass from the gas generator 24 through the complex path passing through the inner chamber 40 and the outer chamber 42, the diffuser 30 is able to absorb more heat from the gasses.

Forming the diffuser 30 from fabric panels 32 and 34 reduces the cost and overall airbag envelope size compared to gas diffuser formed from plastic or metal. Further, the flexible nature of the panels 32 and 34 allows the diffuser 30 to be folded, rolled, or otherwise compacted with the airbag cushion 22. In this way, the overall size of the stowed airbag assembly 20 can be reduced and the shape of the stowed airbag assembly 20 may be adapted to fit a wide variety of mounting locations.

While the diffuser 30 is shown in the figures as being configured for use with a driver's airbag assembly mounted to the steering column (FIG. 1A) or a seat-mounted side airbag (FIG. 1B), the novel ideas embodied in the diffuser 30 may be adapted to a wide range of other airbag assemblies. For instance, the diffuser 30 with a complex path may be used for a passenger side airbag and be mounted to the vehicle dash. According to other exemplary embodiments, the diffuser 30 with a complex gas path may be used for knee airbag assemblies, or side or rear curtain airbag assemblies.

It is to be understood that both the foregoing general description and detailed description are exemplary and explanatory only, and are not restrictive of the invention.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

The construction and arrangement of the diffuser as shown in the preferred and other exemplary embodiments is illustrative only. Although only a few embodiments of the present airbag assembly have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in this disclosure. Accordingly, all such modifications attainable by one versed in the art from the present disclosure within the scope and spirit of the present invention are to be included as further embodiments of the present invention. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present application.

What is claimed is:

1. An airbag assembly, comprising:
   an airbag cushion;
   an inflator to provide inflation gas to inflate the airbag cushion; and
   a diffuser provided between the inflator and the airbag cushion, the diffuser including first and second overlaying panels,
   wherein the first panel has at least one opening overlaying a wall portion of the second panel such that the inflation gas flowing through the at least one opening is forced to change flow direction at least two times before the inflation gas exits the diffuser and enters into the airbag cushion.

2. The airbag assembly of claim 1, wherein the first and second panels trap particulates from the inflation gas to prevent particulates from entering into the airbag cushion.

3. The airbag assembly of claim 1, wherein the first and second panels are fabric panels.

4. The airbag assembly of claim 1, wherein the first and second panels have a same overall shape when unfolded.

5. The airbag assembly of claim 4, wherein the second panel includes at least one opening for the inflation gas to pass through, and wherein the second panel overlays the first panel so that the at least one opening in the second panel is not aligned with the at least one opening in the first panel.

6. The airbag assembly of claim 4, wherein the first panel comprises a plurality of openings, wherein the second panel includes a plurality openings for the inflation gas to pass through, and wherein a pattern of the openings in the first panel is a mirror image of a pattern of the openings in the second panel.

7. The airbag assembly of claim 1, wherein each of the first and second panels includes a body portion with a neck portion, the neck portion forming an inlet for the inflation gas to enter the diffuser, and wherein the second panel includes at least one opening in the body portion.

8. The airbag assembly of claim 7, wherein the diffuser is configured so that the inflation gas enters an inner chamber of the diffuser via the neck portion of the first panel, then the inflation gas passes through the at least one opening in the first panel to enter into an outer chamber of the diffuser, wherein the inflation gas then passes through the at least one opening in the second panel to enter into the airbag cushion.

9. An airbag assembly, comprising:
   an airbag cushion;
   an inflator to provide inflation gas to inflate the airbag cushion; and
   a diffuser provided between the inflator and the airbag cushion, the diffuser including a first panel and a second panel,
   wherein the first and second panels each include a plurality of openings for the inflation gas to pass through, and
   wherein the plurality of openings in the first panel are not aligned with the plurality of openings in the second panel.

10. The airbag assembly of claim 9, wherein the first and second panels trap particulates from the inflation gas to prevent particulates from entering into the airbag cushion.

11. The airbag assembly of claim 9, wherein the first and second panels are fabric panels.

12. The airbag assembly of claim 9, wherein a pattern of the openings on the second panel is a mirror image of a pattern of the openings in the first panel.

13. The airbag assembly of claim 9, wherein each of the first and second panels includes a body portion with the openings and a neck portion, the neck portion forming an inlet for the inflation gas to enter the diffuser.

14. The airbag assembly of claim 13, wherein the diffuser is configured so that the inflation gas enters an inner chamber of the diffuser via the neck portion of the first panel, then the inflation gas passes through the openings in the first panel to enter into an outer chamber of the diffuser, wherein the inflation gas then passes through the openings in the second panel to enter into the airbag cushion.

15. A method of making a diffuser for an airbag assembly, comprising:

provliding first and second panels;
providing openings in each of the first and second panels;
overlaying the second panel on the first panel;
folding the overlayed panels along a central longitudinal midline of the overlayed panels; and
attaching the folded and overlayed panels to an inflator and/or airbag cushion.

16. The method of claim 15, wherein when the panels are overlayed, the openings in the first panel do not align with the openings in the second panel.

17. The method of claim 15, further comprising sewing together edges of the folded and overlayed panels.

18. The method of claim 15, wherein the first panel forms an inner chamber for the diffuser, and the second panel forms an outer chamber for the diffuser.

* * * * *